United States Patent [19]

Bindra et al.

[11] Patent Number: 4,490,219
[45] Date of Patent: Dec. 25, 1984

[54] METHOD OF MANUFACTURE EMPLOYING ELECTROCHEMICALLY DISPERSED PLATINUM CATALYSTS DEPOSITED ON A SUBSTRATE

[75] Inventors: Perminder S. Bindra, Ossining; David N. Light, Putnam Valley, both of N.Y.

[73] Assignee: International Business Machines Corporation, Armonk, N.Y.

[21] Appl. No.: 433,328

[22] Filed: Oct. 7, 1982

[51] Int. Cl.³ .......................... C25D 5/00; C25D 5/18
[52] U.S. Cl. ................................ 204/23; 204/DIG. 9
[58] Field of Search ............. 204/23, DIG. 8, DIG. 9

[56] References Cited

U.S. PATENT DOCUMENTS

| | | | |
|---|---|---|---|
| 3,276,976 | 10/1966 | Juliard | 204/DIG. 9 |
| 3,616,434 | 10/1971 | Hausner | 204/DIG. 9 |
| 3,994,785 | 11/1976 | Rippere | 204/23 |
| 4,038,158 | 7/1977 | Bursey | 204/23 |

OTHER PUBLICATIONS

Plating, Aug. 1969, pp. 909–913.

*Primary Examiner*—Thomas Tufariello
*Attorney, Agent, or Firm*—Graham S. Jones, II

[57] ABSTRACT

A substrate such as carbon, graphite, or various semiconductors is coated with a "two-dimensional" thin film form of flat isolated crystallites of platinum, palladium or silver to form a catalyst useful in a fuel cell. The method of formation of the catalyst is to place the substrate in an electrolyte such as $H_2PtCl_6$ about 1% and one molar sulfuric acid. The potentiostatic pulse plating method is employed. A high potential pulse of very short duration is followed by a low potential of substantial duration. The very high potential nucleates crystals at various randomly distributed nucleation sites such as imperfections in the surface of the substrate. The resulting catalyst has a large surface area of hexagonal crystals about 20 to 40 Angstroms in diameter.

8 Claims, 15 Drawing Figures

FIG. 1.1
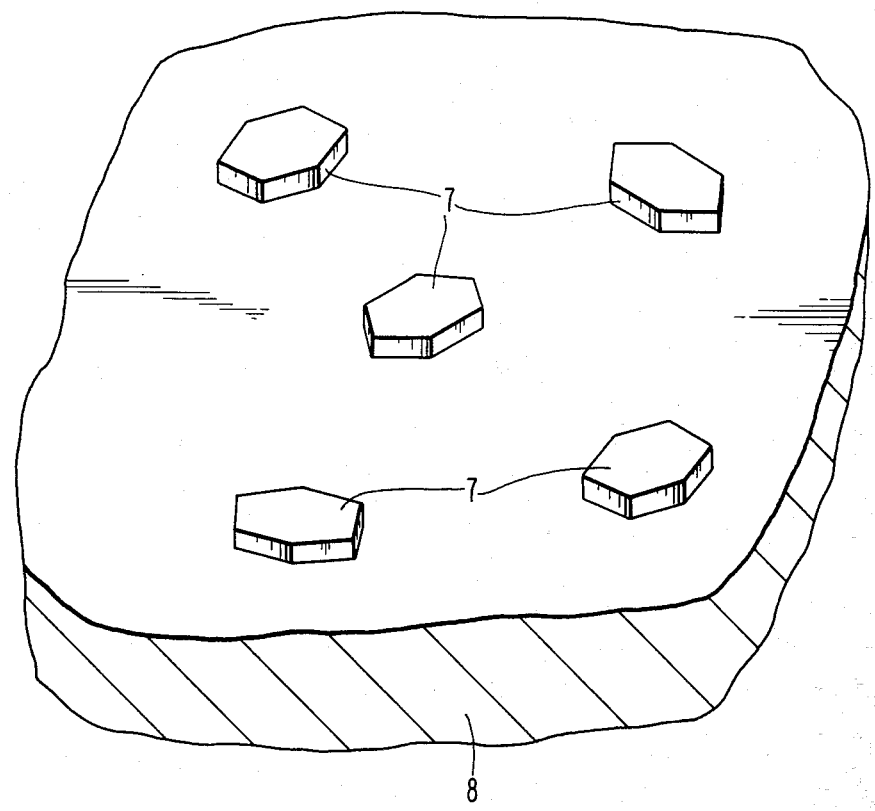

FIG. 1.2
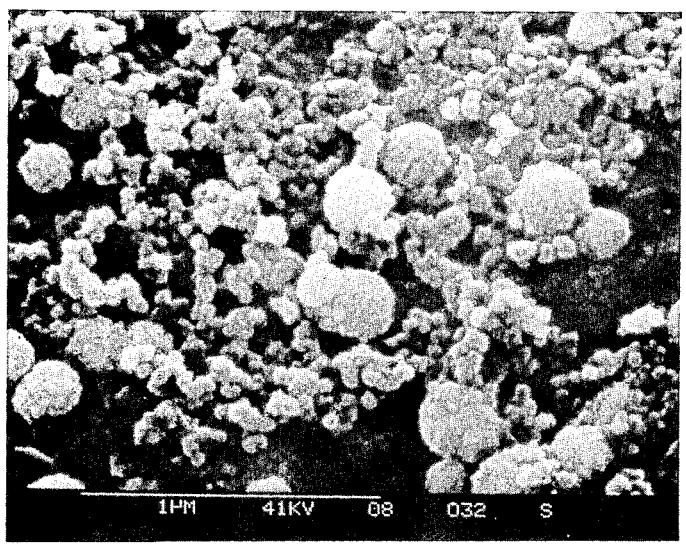
FIG. 1.3
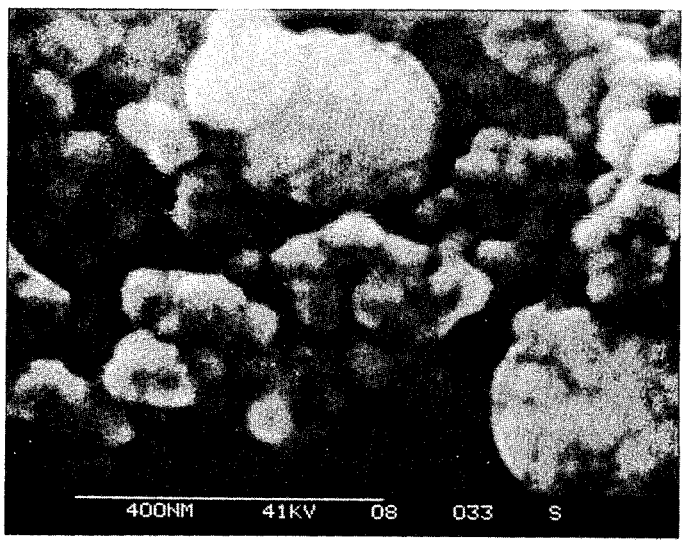

FIG. 1.4

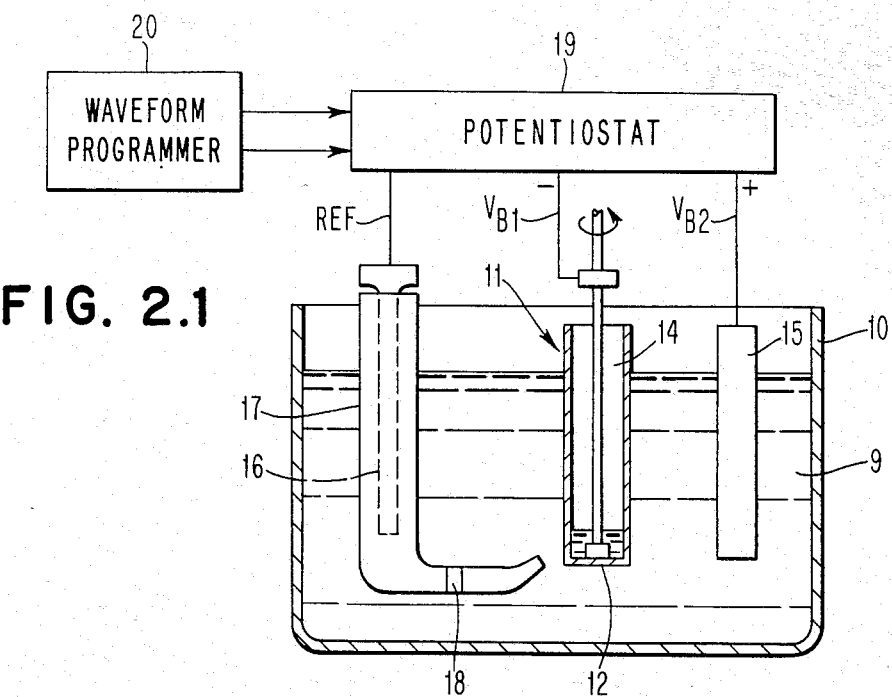
FIG. 2.1
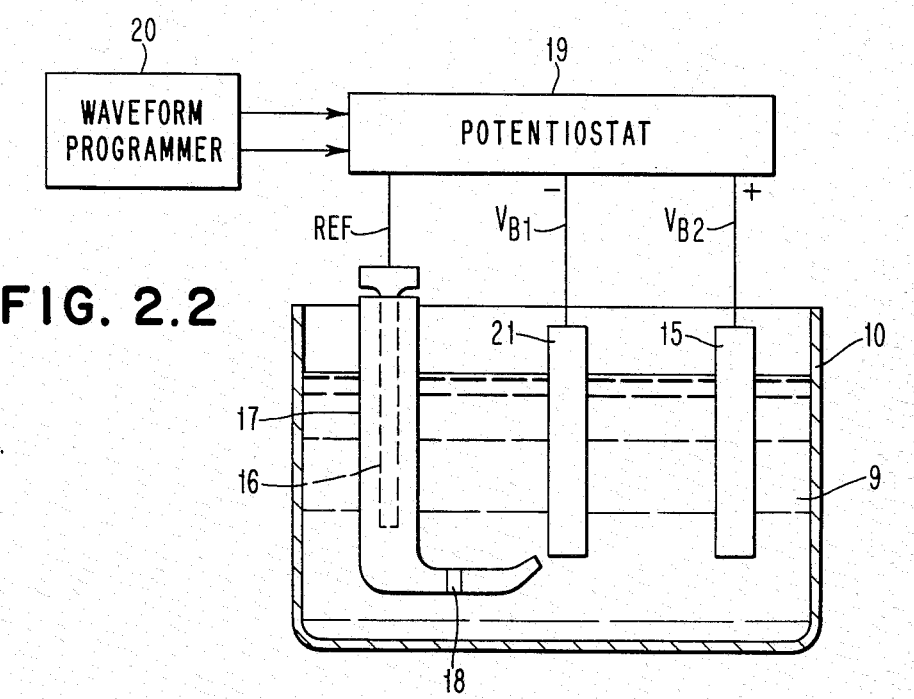
FIG. 2.2

FIG. 2.3
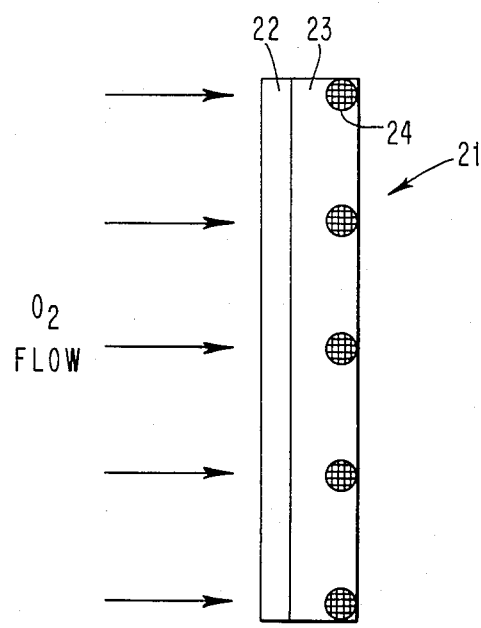
O₂ FLOW
FIG. 2.4
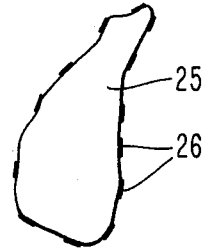

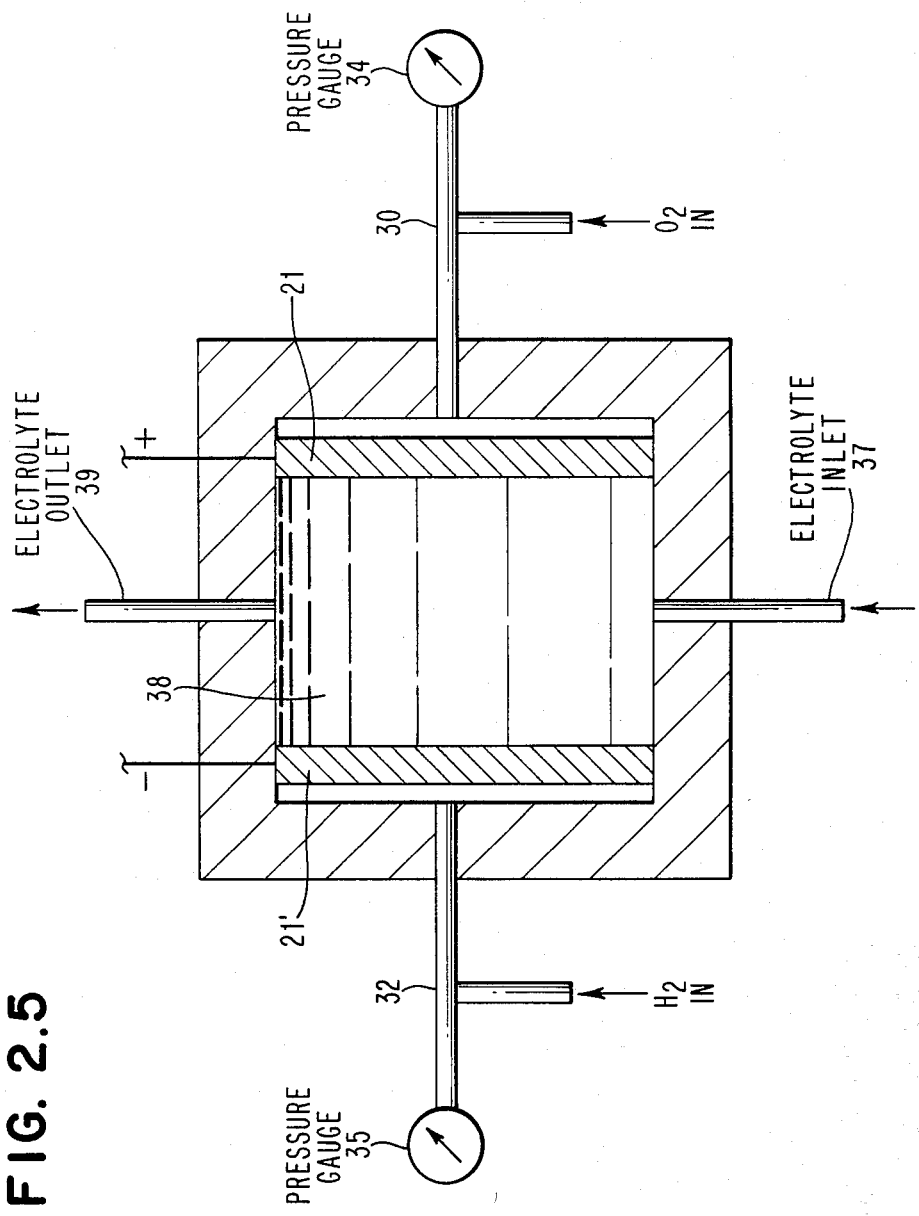
FIG. 2.5

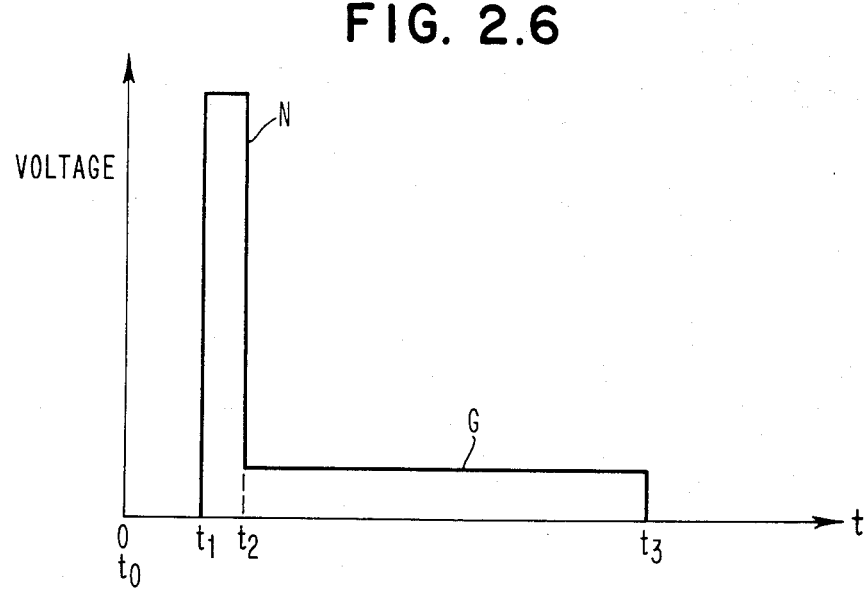
FIG. 2.6
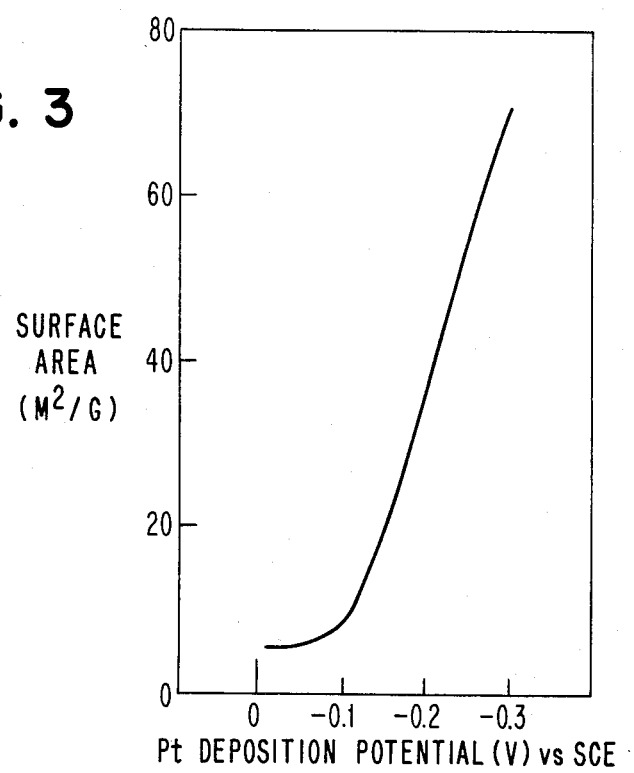
FIG. 3

FIG. 4.1
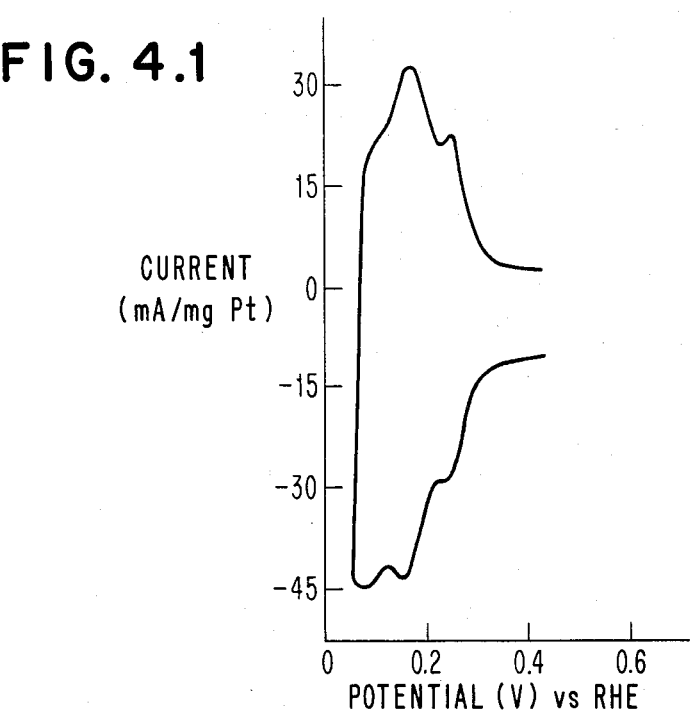
FIG. 4.2
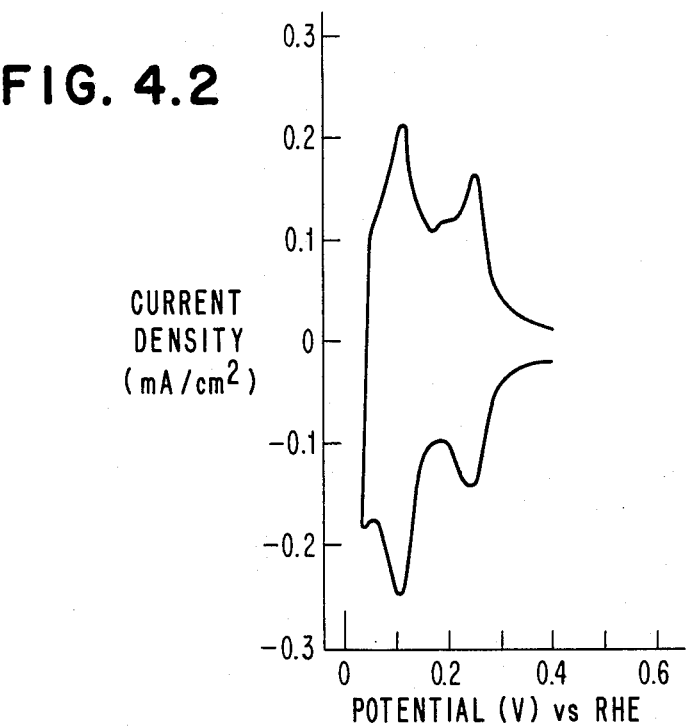

4,490,219

METHOD OF MANUFACTURE EMPLOYING ELECTROCHEMICALLY DISPERSED PLATINUM CATALYSTS DEPOSITED ON A SUBSTRATE

BACKGROUND OF THE INVENTION

1. Field of the Invention

This invention relates to electrodes in the form of a polycrystalline structure of a plurality of separate crystallites dispersed on a substrate, and to the electrochemical manufacture of articles incorporating catalysts. More particularly this invention relates to dispersed catalysts composed of a plurality of separate crystallites formed by electrochemical deposition.

2. Description of the Prior Art

U.S. Pat. No. 3,836,436 of Rivola et al describes a process of forming silver powder by deposition on an anode of graphite, Pt, Pt-Rh, Ti, etc. Current is passed through the electrodes for 3 to 10 seconds followed by off periods of from 3 to 60 seconds. Particles range in size between 30 and 150 nm. U.S. Pat. No. 3,198,716 suggests halving or continuously reducing current density during electrodeposition to improve coercivity in fine particles of magnetic material comprising single-domain elongated magnetic particles.

Barclay et al IBM Technical Disclosure Bulletin Vol. 16, No. 8 p. 2573 (Jan. 1974) describes potentiostatic plating of NiFe plus a small amount of Pd at −950 mV and pure Pd at −500 mV subsequently. Some features of the instant invention which are lacking in the above references are as follows:

(1) The single pulse method of producing much smaller two-dimensional crystallites, (2) The double pulse method of producing crystallites, and (3) The refurbishability of electrodes.

SUMMARY OF THE INVENTION

In accordance with this invention, a substrate such as carbon, graphite, or various semiconductors is coated with "two-dimensional", flat isolated crystallites of platinum, palladium or silver to form a catalyst useful in a fuel cell, metal-air batteries, etc. The method of formation of the catalyst is to place the substrate in an electrolyte such as $H_2PtCl_6$ of about a 1% weight-/volume (w/v) solution and one molar sulfuric acid. The potentiostatic pulse plating method is employed. A high potential pulse of very short duration is followed by a low potential pulse of substantial duration. The very high potential used nucleates crystals at various randomly distributed nucleation sites, such as imperfections on, or in the surface of the substrate. The resulting electrode is coated with catalytic metal which serves as a metallic catalyst which has a large surface area formed by hexagonal crystallites, each of which is about 2 to 4 nm in diameter. In accordance with this invention, a plurality of crystallites of a metal to be employed as a catalyst are deposited on a substrate by applying a large plating potential initially, followed by a sharply lower potential to form flat isolated crystallites of the metal serving as a metallic catalyst on the substrate.

Further in accordance with this invention, a substrate is coated with a plurality of crystallites having tabular (flat and expansive surface) characteristics composed of metals suitable for catalytic action in a fuel cell. This is a technique for fabricating a long-lived, in-situ refurbishable, metallic surface composed of crystallites of Pt, Ag, Pd, etc. to be employed as catalysts. These catalysts afford a large ratio of surface area to volume. The form of catalyst of this invention is particularly applicable to use in energy conversion fuel cells and other well known applications for such catalysts as metal-air batteries, or chlor-alkali cells.

BRIEF DESCRIPTION OF THE DRAWINGS

FIG. 1.1 is a perspective view of a substrate carrying a plurality of tabular crystals in accordance with this invention.

FIG. 1.2 is an SEM photograph of the platinum crystals deposited on ordinary pyrolytic graphite at 0 MV vs SCE (Saturated Calomel Electrode) with a magnification of about 50,000 times.

FIG. 1.3 is an SEM photograph similar to FIG. 1.2 with a magnification of about 120,000 times.

FIG. 1.4 is a Transmission Electron Micrograph (TEM) of platinum deposited on ordinary pyrolytic graphite at −400 MV vs SCE at a magnification of about 325,000 times.

FIG. 2.1 shows a plating system in accordance with this invention employing a rotating disk cathode electrode, and a control system for providing crystallites in accordance with this invention. A calomel electrode is incorporated in the system.

FIG. 2.2 shows a modification of FIG. 2.1 wherein the cathode is affixed, i.e. does not rotate.

FIG. 2.3 shows a porous electrode in accordance with this invention.

FIG. 2.4 shows a particle of carbon in accordance with this invention which includes crystallites in accordance with this invention on the surface of the particle.

FIG. 2.5 is a fuel cell incorporating the porous types of electrodes shown in FIG. 2.3.

FIG. 2.6 shows a plot of voltage versus time for a system in accordance with FIGS. 2.1 and 2.2 wherein the initial nucleation pulse has a voltage of high value and the subsequent growth pulse is of a substantially lower voltage which will not tend to nucleate further crystallites.

FIG. 3 is a plot of the variation of the surface area of platinum with the variation in the deposition potential.

FIG. 4.1 is a cyclic voltammogram on platinum crystallites supported on ordinary pyrolytic graphite in 1M $H_2SO_4$. The Pt loading equals 3.3 micrograms per sq. CM with a surface area of about 70 sq. M. per gram with a sweep rate of 0.1 V/sec.

FIG. 4.2 shows the cyclic voltammogram on polycrystalline platinum in 0.5M $H_2SO_4$ with a sweep rate equal to 0.1 V/sec.

DESCRIPTION OF THE PREFERRED EMBODIMENT

Figure 5:
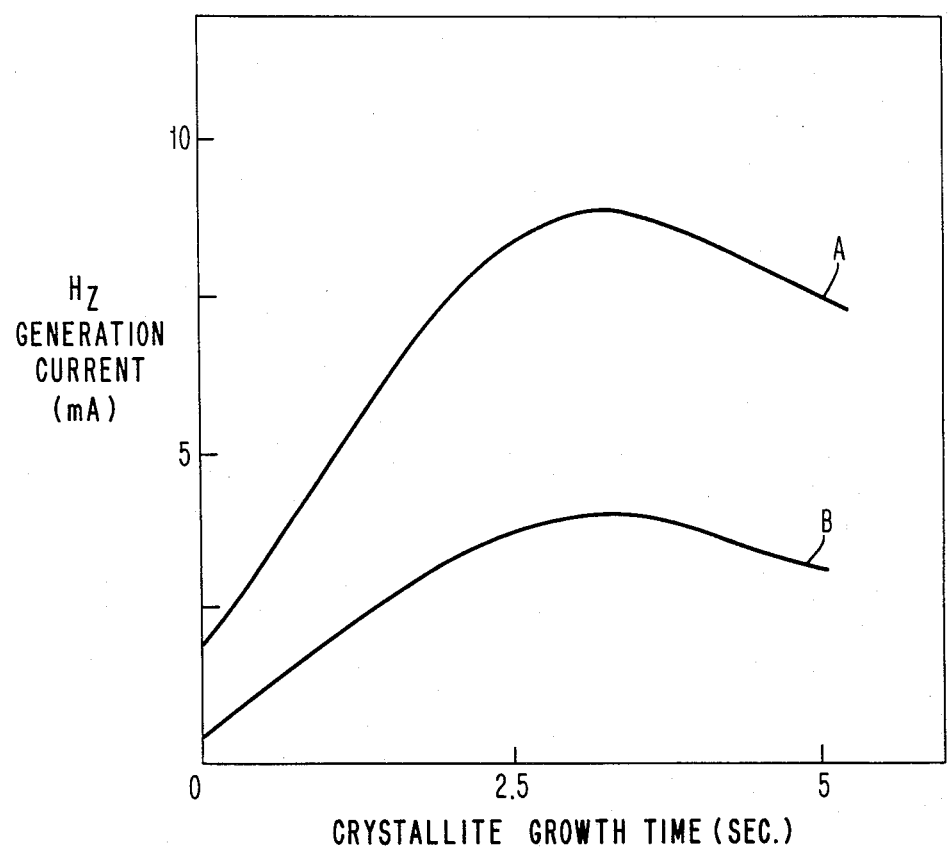
FIG. 5 shows a graph of a variation of hydrogen gas generation currents as a function of Pt crystallite size. Platinum deposition and hydrogen generation potentials with curve A representing −350 volts and curve B representing −300 Volts vs SCE.

This invention employs a potentiostatic pulse plating method for producing catalysts with high surface areas on the surface of the substrate onto which they are being deposited. In the potentiostatic pulse plating method, the potential of the cathodic electrode to be plated is stepped from a more positive potential which is at an anodic level with respect to the reversible potential of the metal to be deposited to a more negative potential range at which the metal deposits on the cathode. The potential applied to the cathode with respect to the anode must be more negative than the reversible potential of a given metallic element so that the given metal in solution and on the anode (if any) will deposit on the cathode. Below the reversible potential, (at what is called the under potential) the given metal will not deposit on the cathode, but will return to solution or be etched away electrochemically. The size of the metallic crystallites formed by this process and hence the surface area of the catalyst produced is determined by the time duration of the step function application of the negative potential to the cathode with respect to the anode. We have discovered that the application of a large voltage nucleation pulse between the anode and the cathode can be advantageous in effective formation of nuclei at nucleation sites on the substrate, whereas at lower potentials such nuclei are not formed sufficiently rapidly to be practical. If the metal deposition occurs by means of progressive nucleation, then the crystallites can be formed with a narrow range of size distribution, by applying an initial higher potential nucleation pulse. In this case, the first pulse, i.e., the nucleation pulse, is a short, high voltage pulse with a short time duration and a large amplitude whereas the second pulse, (which is the crystal growth pulse) is of such a low overpotential (i.e., exceeds the value of the reversible potential by such a small quantity) that no further nucleation can occur during its application. The growth referred to is the plating upwardly in the form of a flat or tabular plating of crystallites 7 on substrate 8 as shown in FIG. 1.1. The crystallites 7 deposit at the nucleation sites without the formation of nodular or hemispherically extending outer surfaces. The increase in size which occurs during the growth pulse or second pulse is characterized by an extension of the crystallites horizontally on the surface of the substrate. A single atom or a few atoms at a nucleation site would tend to be unstable and to migrate or to dissolve into the electrolyte. By such growth, it is possible to change the size and surface areas of the crystallites deposited by changing the time duration of the second pulse thereby changing the horizontal dimensions of the crystallites, which increases their surface area and their mechanical adhesion to the substrate. Therefore, this method has the distinct advantage that it provides a means for producing dispersed (i.e., widely spaced apart) crystallites 7 on a substrate 8 to form a catalyst possessing well-controlled crystal size and controlled surface area (as a result of the controlled size). The crystallites 7 form at dislocations on the surface of the substrate 8 which act as nucleation sites. Experimentation has shown that the mechanical attachment of the crystallites 7 to the substrate 8 is strong enough to prevent the loss of surface area via surface migration which, unfortunately, would result in reduction of surface area by coalescence of crystallites 7 after collision with other crystallites 7. The potentiostatic pulse method of plating has been used to prepare catalyst coated electrodes with crystallites of platinum, palladium and silver which are suitable to be used in fuel cells. The electrodes produced had surface areas greater than 70 square meters per gram of plated metal, i.e., Pt, Pd and Ag. These dispersed metallic crystallites 7 can be prepared on stable conducting supports, i.e., substrates 8, including carbon, graphite, ceramics and various semiconductors. Catalysts formed incorporating crystallites 7 supported in such a manner can be employed in the catalysis of various chemical reactions such as $H_2$ and $O_2$ reduction and generation and also other electrochemical reactions such as CO, HCHO oxidation, the hydrogenation of organic species and the decomposition of reducing agents (such as formaldehyde, dimethylamine borane, hydrazine, pyrophosphate, etc.) which are important to electroless plating baths.

The potentiostatic pulse plating method of this invention can also be employed to produce crystallites of alloys with high surface areas. It is believed that the formation of the tabular or flat crystallites of this invention is afforded with the metals plated by the codeposition of hydrogen which leads to two-dimensional hexagonal crystallites being formed all over the substrate. The hydrogen is believed to adsorb in a very thin layer on the order of one atom thick on the surface of the metallic crystallites. As an adatom of a metal moves towards a crystallite, it may carry a hydrogen atom and will be slowed in its motion by that atom and other hydrogen atoms so that its eventual slow movement to a stable incorporation site on the crystal will facilitate formation of a well-defined crystal structure.

I. Background

The utilization of noble metal catalysts in fuel cells and related technologies requires a catalyst with the highest surface area practicable. This is normally achieved by using dispersed metallic electrodes supported on carbon or graphite supports. The dispersed Pt electrodes have traditionally been produced by the so-called impregnation method (C. R. Adams, H. A. Benesi, R. M. Curtis and R. G. Meisenheimer, J. Catal. 1 (1962) 336 and T. A. Darling and R. L. Moss, J. Catal. 5 (1966) 111 and J. Catal. 7 (1967) 378) in which Pt crystallites are produced either by the chemical reduction of Pt complexes or the thermal decomposition of platinum compounds. In this invention Pt crystallites have been prepared by electrocrystallization of the metal using the potentiostatic pulse method. The platinum crystallites were then characterized using scanning and transmission electron microscopy and electrochemical methods. The mechanism of crystal growth and the nucleation behavior have been studied as a function of the deposition potential. It is shown that simultaneous evolution of hydrogen in the hydrogen generation region leads to the formation of two-dimensional crystallites of well-defined geometry. A concept has been used in some impregnation methods in which trace amounts of copper ions have been added to the system to modify the crystal growth behavior and produce two-dimensional crystallites of ruthenium and osmium (E. B. Prestridge, G. H. Via and J. H. Sinfelt, J. Catal. 50 (1977) 115).

Measurements provide evidence of the nature of the catalytic process by which hydrogen evolution on small platinum crystallites takes place. At least three types of catalytic sites are known (G. Somorjai, J. Electrochem. Soc., 124 (1977) 205C) for platinum crystallites, the corner atoms, the edge atoms and the flat surface atoms. Each type of atom has a different activity with respect to enhancement of hydrogen generation (R. Van Hardeveld and F. Hartog, Surface Sci. 15 (1969) 159). The relative catalytic activity of the edge atoms and the flat surface atoms can be measured by studying hydrogen evolution on two-dimensional Pt crystallites at various stages of their growth.

FIGS. 1.2 and 1.3 show scanning electron micrographs (SEMs) of Pt deposited on ordinary pyrolytic graphite at 0 mV vs SCE at magnifications as shown. FIG. 1.4 shows a transmission electron micrograph of Pt deposited on ordinary pyrolytic graphite at −400 mV vs SCE at a magnification as shown.

II. Experimental

Electrodes, Cells, Solutions and Equipment

All measurements were carried out in apparatus shown in FIG. 2.1 in a glass cell 10 under conditions of controlled mass transport with the rotating disk technique. (See Chemical Engineering, July 17, 1976 p. 111.) Fabrication of the rotating disk electrodes 11 has been described elsewhere (J. P. Randin and E. Yeager, J. Electroanal. Chem. Interfacial Electrochem. 36 (1972) 257). After fabrication the ordinary pyrolytic graphite electrode 12 (working electrode) was polished to a near mirror finish on a polishing wheel using successively finer grades of alumina and distilled water. Each electrode was finally etched electrochemically by anodic polarization in the solutions in which the metal deposition experiments were carried out. The electrode surfaces exposed to the solution were disk shaped and had areas of approximately 0.2 cm$^2$. The counter electrode 15 was a platinum foil and the reference electrode 16 was a saturated calomel electrode (SCE). The electrochemical cell was a standard laboratory type with a separate compartment 17 for the reference electrode 16. The reference electrode compartment 17 was separated from the working electrode compartment 10 by a frit 18 of an asbestos fiber wick in glass. For the hydrogen evolution measurements a solution bridge filled with 1M $H_2SO_4$ was used between the calomel electrode and the reference electrode compartment. The solution bridge was equipped with a three-way stop-cock to avoid Cl$^-$ contamination.

The electrodes are powered by a commercially-available potentiostat energized by a commercially available waveform programmer. See FIG. 6 and the description thereof below. The platinum deposition experiments were carried out in an electrolyte solution 9 of 1M $H_2SO_4$ containing $2 \times 10^{-3}$ M $H_2PtCl_6$. One molar $H_2SO_4$ was prepared from ULTREX J. T. Baker ultrapure $H_2SO_4$ and triply distilled water while $H_2PtCl$ was obtained as a 10% w/v solution. The solutions were deoxygenated with purified nitrogen before taking measurements. The potentiostatic pulse method was used for both the platinum deposition and the hydrogen evolution reactions. Single and double potential pulse profiles were used. Potential control of the working electrode was achieved with a PAR 173 potentiostat 19 in conjunction with a PAR 175 universal programmer 20. The cyclic voltammograms and the current time transients obtained were recorded on a commercial Hewlett-Packard x-y-t recorder.

FIG. 2.2 shows that a stationary porous, gas fed, carbon and metal screen electrode 21 can be employed as the working electrode. Otherwise the embodiment of FIG. 2.2 is the same as FIG. 2.1. A porous electrode 21 is shown in greater detail in FIG. 2.3 where it is seen that a porous substrate 22 of Teflon polytetrafluoroethylene carries an amalgam of small compressed carbon particles 23 supported with a matrix of metallic wires 24 which are woven into a screen. Wires 24 are composed of a metal such as nickel. The wires 24 connects to the lead $V_{B1}$ electrically in FIG. 2.2 to provide an attractive force to the metallic ions in the electrolyte 9 which causes them to be deposited on the myriad surfaces of the carbon particles 23 both on the interior and the exterior of the electrode 21. Prior to application of electrochemical deposition pulses from the programmer 20, the electrolyte is permitted to diffuse within the porous electrode 21, which is to be adapted for use in a fuel cell as a porous electrode. Porous electrode 21 is suitable for use as a gas fed electrode in a fuel cell, where gas is passed through electrode 21 into the electrolyte on the other side of electrode 21 as shown in FIG. 2.5. FIG. 2.4 shows a particle 25 of carbon 23 enlarged from microscopic size which has been plated with numerous small, tabular crystallites 26 of the metallic catalyst, spread widely over the surface of the microscopic particle 25.

FIG. 2.5 shows a fuel cell incorporating the porous electrode 21 of FIG. 2.3.

FIG. 2.5 shows an oxygen-hydrogen fuel cell which incorporates a set of porous gas-fed electrodes 21 and 21' which possess the structure seen in FIG. 2.3 which are adapted to be used with gas source 31 of oxygen, in the case of anode electrode 21, and gas source 33 of hydrogen in the case of cathode electrode 21'. Oxygen passes through line 30 to electrode 21 and its pressure is measured by the gauge 34. Hydrogen passes through line 32 to the electrode 21' and pressure is measured by the gauge 35. The electrolyte is introduced via electrolyte inlet line 37 into the electrolyte chamber 38 which holds acid or alkaline electrolyte as a matter of choice. Spent electrolyte and unused or excess hydrogen and oxygen are exhausted from the electrolyte chamber 38 by means of outlet line 39.

FIG. 2.6 shows a trace of voltage versus time for performing electrochemical deposition in accordance with this invention. Preferably, a time $t_0$ to $t_1$ the potential on the working electrode is about 0.6 V positive for anodic etching of the substrate. From time $t_1$ to time $t_2$ a high voltage nucleation pulse N is applied to the working electrode 11 or 21 in FIGS. 2.1 and 2.2. The interval from $t_1$ to $t_2$ is a relatively short time on the order of a few microseconds, at a voltage of about −0.3 V to −0.5 V vs SCE for platinum. Next, the crystal growth pulse G is applied, preferably immediately following the nucleation pulse N from time $t_2$ to time $t_3$ for a range of from about 1 milliseconds to 3 milliseconds for platinum. The voltage should be in the range of about +0.2 V to +0.1 V vs SCE.

III. Crystallite Size Control and Stability

The electrochemical method is particularly useful for the preparation of high surface area Pt catalysts for fuel cell and other applications. Its efficacy as a preparative technique for high surface area Pt catalyst lies in its ability (a) to produce dispersed Pt of well-controlled crystallite size, and (b) to produce two-dimensional crystallites with enhanced crystallite-substrate interactions. This latter is achieved by electrocrystallization of platinum in the hydrogen generation region.

It is clear from the classical equilibrium theory of nucleation R. A. Sigsbee and G. M. Pound, Adv. Colloid Interface Sci. 1 (1967) 335 that the critical size of the crystallite, is related inversely to the deposition overpotential, $\eta$. FIG. 3 is a graph of surface area vs platinum deposition potential vs SCE, which shows the variation of the surface area of Pt with the deposition potential. FIG. 3 illustrates the above point insofar as size and area are also inversely related, because numerous small crystallites will provide a larger surface area than fewer but larger crystals.

The total surface area of the crystallites was measured by the hydrogen adsorption-desorption method, using a charge of ∼210 $\mu c/cm^2$. The platinum loading was calculated from the metal deposition charge with a correction for the simultaneous generation of hydrogen during the deposition reaction. The correction is based on separate measurements of $H_2$ formation on Pt crystallites in the absence of solution phase Pt. The pulse duration used for the preparation of the crystallites was adjusted for each potential so as to keep the total charge passed for the Pt electrodeposition constant. FIG. 3 clearly shows that it should be possible to achieve higher surface areas per gram of Pt deposited with more cathodic potential pulses. The surface area of 70 $m^2/g$ at $-0.3$ V vs SCE is equivalent to spherical crystallites of about 4 nm diameter.

IV. Electrochemical Characterization i. Electrosorption of Hydrogen

Hydrogen electrosorption characteristics on electrodeposited Pt crystallites were investigated using the cyclic voltammetry technique. These crystallites were electrodeposited from a solution of 1% $H_2PtCl_6$ and therefore to remove all traces of chloride ions still adsorbed on the crystallites, the electrode was rotated in 1M NaOH at 2500 rpm for 1 minute prior to making the cyclic voltammetry measurements. Current voltage curves were obtained on Pt crystallites electrodeposited in both the double layer region and the hydrogen generation region. FIG. 4.1 shows the hydrogen electrosorption region of the voltammetry curve obtained on Pt crystallites electrodeposited at $-0.3$ V vs SCE on ordinary pyrolytic graphite in 1M $H_2SO_4$. The curve obtained in the same potential region on polycrystalline Pt is shown in FIG. 4.2. The hydrogen adsorption-desorption peaks obtained on Pt crystallites electrodeposited in the double layer region were similar to those obtained on bulk Pt. The cyclic voltammogram in FIG. 4.1 however, shows three directly observable peaks in both the cathodic and the anodic directions indicating the presence of three different "types" of adsorbed hydrogen. Four or five peaks are normally observed on polycrystalline bulk Pt in pure $H_2SO_4$ (H Angerstein-Kozolwska, W. B. A. Sharp and B. E. Conway, in Proceedings of the Symposnium on Electrocatalysis, Editor M. W. Breiter, The Electrochemical Soc., Princeton, N.J. (1974).

The curve in FIG. 4.1 shows that there is marked asymmetry in the hydrogen reduction and the hydrogen oxidation peaks on the electrodeposited crystallites. The asymmetry is probably a result of impurities in the system particularly dissolved oxygen. The use of an ordinary pyrolytic graphite substrate may also have led to the introduction of impurities and this may be partially responsible for the asymmetry of the cathodic and the anodic hydrogen peaks. Some asymmetry is also evident in the voltammetry curves of Kinoshita et al (K. Kinoshita, J. Lindquist and P. Stonehart, J. Catal. 31 (1973) 32), on high surface area Pt electrodes on graphite supports. Comparison of the cyclic voltammetry curve obtained on the Pt crystallites with that obtained on polycrystalline platinum surface shows distinct differences in peak potentials. The "third" anodic peak which is normally the smaller peak and is attributed to a minor species of absorbed hydrogen (J. C. Huang, W. E. O'Grady and E. Yeager, J. Electrochem. Soc. 124 (1977) 1731), appears to be the most prominent peak in the voltammograms obtained on the Pt crystallites. This may be due to impurities in the system but it is more likely that the large "third" peak is due to a surface interaction associated with the surface orientation of Pt crystallites obtained by electrodeposition of the metal.

Cyclic voltammetry curves obtained on single crystal Pt surfaces (R. M. Ishikawa and A. T. Hubbard, J. Electroanal. Chem. Interfacial Electrochem. 69 (1976) 317), show similar behavior for the surface with the (111) orientation. This suggests that Pt crystallites electrodeposited in the hydrogen generation region have predominantly the (111) surface orientation.

ii. Hydrogen Evolution

The Pt crystallites were electrodeposited at a fixed potential in the hydrogen generation region from a solution containing 1% W/V $H_2PtCl_6$ and 1M $H_2SO_4$. The electrode was then removed from the cell, rinsed with high purity water, and transferred into a cell containing the base electrolyte only. Hydrogen generation currents on these crystallites were then obtained by stepping the potential (in a potentiostatic experiment) to the original Pt deposition potential. Pt crystallites of different sizes were obtained by depositing the metal for different periods of time at a fixed potential. FIG. 5 shows the hydrogen generation electrical currents obtained as a function of the growth time of Pt crystallites for two overpotentials. This method then provides a means for monitoring the growth of discrete nuclei of Pt. The form of the curves in FIG. 5 suggests the mechanism by which electrocrystallization of Pt in the hydrogen evolution region takes place. Both the curves in FIG. 5 pass through a maximum indicating that the hydrogen evolution reaction occurs both on the flat top as well as the periphery of the isolated growth centers. At short times, increasing $H_2$ current due to increasing length of the growing periphery of the growth centers is observed, but at longer times the growth centers overlap resulting in ever decreasing peripheral length and hence a falling current is obtained. After a certain time the hydrogen evolution current reaches a limiting value. In FIG. 5 this current is due mainly to catalysis on the flat surface atoms of the Pt deposit.

Figure 6:
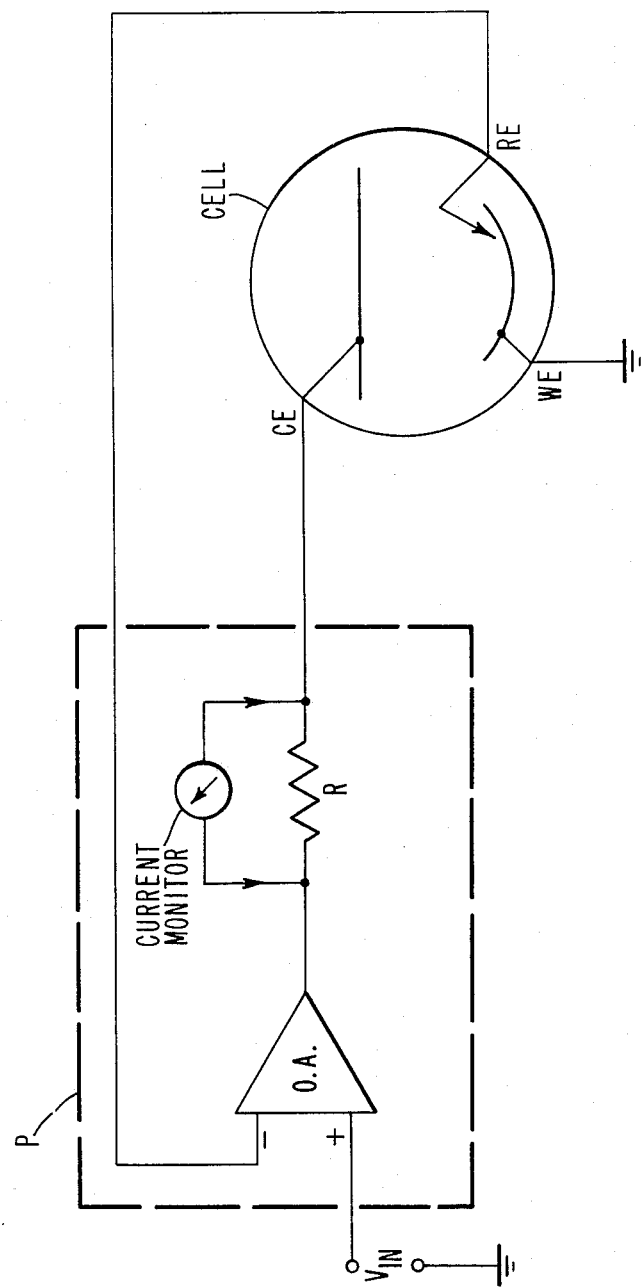
FIG. 6 is an electrical schematic diagram of a circuit for potentiostatic plating in accordance with this invention.

FIG. 6 shows a potentiostatic circuit that can be used in connection with the instant invention. The voltage supplied to the system is Vin. A potentiostat P is shown in a dotted block, containing an operational amplifier OA. The cell contains a counter electrode CE, a reference electrode RE and a working electrode WE.

Having thus described our invention, what we claim as new, and desire to secure by Letters Patent is:

1. A method of forming a catalyst comprising plating a substrate plated with thin, dispersed crystallites of a metal in a system including an anode electrode and a cathode electrode, said method comprising, applying a nucleation pulse to said cathode electrode, said nucleation pulse having a potential above the nucleation potential of said metal relative to said anode electrode, and said nucleation pulse having a duration on the order of the microsecond range, and then applying a growth pulse having a potential below said nucleation potential for a longer period of time an order of magnitude longer than said nucleation pulse, to add mass to said crystallites.

2. A method of deposition of a plurality of crystals of a catalyst on a substrate by applying a nucleation plating potential initially, said nucleation potential being above the nucleation potential of said metal, application of said nucleation potential being followed by a sharply lower potential, below said nucleation potential of said metal for a longer period of time an order or magnitude longer than said nucleation pulse to form flat isolated crystallites of said catalyst metal on said substrate.

3. An article of manufacture comprising a catalyst formed by plating a substrate with thin, dispersed crystallites of a metal by the steps of
  applying a nucleation pulse to a cathode electrode,
  said nucleation pulse having a potential above the nucleation potential of said metal relative to said anode electrode,
  and then applying a growth pulse having a potential below said nucleation potential for a longer period of time an order of magnitude longer than said nucleation pulse, to add mass to said crystallites.

4. An article of manufacture comprising a deposit of a plurality of crystals of a catalyst on a substrate,
  said crystals having been deposited by applying a nucleation plating potential initially,
  said nucleation potential being above the nucleation potential of said metal,
  application of said nucleation potential being followed by a plating potential comprising a sharply lower potential, below said nucleation potential of said metal, for a longer period of time an order of magnitude longer than said nucleation pulse, to form flat isolated crystallites of said catalyst metal on said substrate.

5. A method of forming a catalyst comprising plating a substrate plated with thin, dispersed crystallites of platinum comprising,
  applying a nucleation pulse to a cathode electrode said crystals having been deposited by applying a plating potential of less than or equal to about $-0.3$ V vs SCE, said nucleation pulse having a duration on the order of a few microseconds,
  said nucleation pulse having a potential above the nucleation potential of said platinum relative to the anode electrode
  and then applying a growth pulse having a potential below said nucleation potential said growth pulse having a potential greater than or equal to about 0.1 V vs SCE for a longer period of time to add mass to said crystallites,
  said growth pulse having a duration of about one to several milliseconds to form flat, isolated tabular crystallites of said platinum catalyst on said substrate.

6. A method for deposition of a plurality of crystals of a catalyst on a substrate by applying a plating potential,
  said potential being above the nucleation potential of said platinum initially said nucleation potential being less than or equal to about $-0.3$ V vs SCE,
  said nucleation potential comprising a pulse having a duration on the order of a few microseconds, followed by application of a plating potential pulse less than said nucleation potential of said platinum said plating potential being greater than or equal to about $+0.1$ V vs SCE
  said plating potential pulse having a duration of about one to several milliseconds to form flat, isolated tabular crystallites of said platinum catalyst on said substrate.

7. An article of manufacture comprising a catalyst formed by plating a substrate with thin, dispersed crystallites of platinum by the steps of
  applying a nucleation pulse to a cathode electrode
  said nucleation pulse having a potential above the nucleation potential of said platinum relative to the anode electrode,
  said nucleation pulse having a duration on the order of a few microseconds,
  said nucleation potential being less than or equal to about $-0.3$ V vs SCE,
  and then applying a growth pulse having a potential below said nucleation potential said growth pulse having a potential greater than or equal to about $+0.1$ V vs SCE,
  said growth pulse being applied for a longer period of time with a duration on the order of about one to several milliseconds to add mass to said crystallites.

8. An article of manufacture comprising a deposit of a plurality of hexagonal crystals of a platinum catalyst on a substrate,
  said crystals having been deposited by applying a nucleation pulse with a voltage of about $-0.3$ V vs SCE or less
  said nucleation pulse having a duration on the order of a few microseconds,
  said potential being above the nucleation potential of said platinum initially,
  followed by a plating growth pulse of a sharply lower potential less than said nucleation potential of said platinum of greater than or equal to about $+0.1$ V vs. SCE said growth pulse lasting for a period with a duration on the order of about one to several milliseconds,
  whereby the deposits comprise flat, tabular, hexagonal, isolated crystallites of said platinum catalyst on said substrate.

* * * * *